(12) United States Patent
Ichiba et al.

(10) Patent No.: US 11,397,287 B2
(45) Date of Patent: Jul. 26, 2022

(54) OPTICAL FILM, AND OPTICAL BARRIER FILM, COLOR CONVERSION FILM AND BACKLIGHT UNIT USING THE OPTICAL FILM

(71) Applicant: TOPPAN PRINTING CO., LTD., Tokyo (JP)

(72) Inventors: Hiroki Ichiba, Tokyo (JP); Masato Kurokawa, Tokyo (JP); Koji Murata, Tokyo (JP); Kengo Ozono, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 259 days.

(21) Appl. No.: 16/428,704

(22) Filed: May 31, 2019

(65) Prior Publication Data

US 2019/0285776 A1  Sep. 19, 2019

Related U.S. Application Data

(63) Continuation of application No. PCT/JP2017/035849, filed on Oct. 2, 2017.

(30) Foreign Application Priority Data

Dec. 6, 2016  (JP) .............. JP2016-236956

(51) Int. Cl.
*G02B 1/14* (2015.01)
*B32B 27/08* (2006.01)
(Continued)

(52) U.S. Cl.
CPC ............ *G02B 1/14* (2015.01); *B32B 27/08* (2013.01); *B32B 27/365* (2013.01); *C09D 5/24* (2013.01); *C09D 7/67* (2018.01); *C09D 7/68* (2018.01); *G02B 1/16* (2015.01); *G02B 1/18* (2015.01); *G02B 5/02* (2013.01); *G02B 5/20* (2013.01); *G02B 6/0035* (2013.01);
(Continued)

(58) Field of Classification Search
None
See application file for complete search history.

(56) References Cited

U.S. PATENT DOCUMENTS 5,852,514 A      12/1998  Toshima et al.
2004/0240070 A1*  12/2004  Suzuki .................. G02B 1/111
                                                      359/599
(Continued)

FOREIGN PATENT DOCUMENTS

CN  101815958 A  8/2010
CN  104813097 A  7/2015
(Continued)

OTHER PUBLICATIONS

Machine translation of JP 2013-200332 A1 (Year: 2013).*
(Continued)

*Primary Examiner* — Ramsey Zacharia
(74) *Attorney, Agent, or Firm* — Foley & Lardner LLP

(57) ABSTRACT

An optical film including a first film substrate and a coating layer formed on the first film substrate. The coating layer of this optical film contains a binder resin and fine particles with an average size of 0.5 μm or more and 10.0 μm or less and a standard deviation in size that is less than ½ of the average size.

17 Claims, 9 Drawing Sheets

(51) Int. Cl.
*B32B 27/36* (2006.01)
*C09D 5/24* (2006.01)
*C09D 7/40* (2018.01)
*G02B 1/16* (2015.01)
*G02B 1/18* (2015.01)
*G02B 5/02* (2006.01)
*G02B 5/20* (2006.01)
*F21V 8/00* (2006.01)
*B32B 23/08* (2006.01)
*B32B 27/28* (2006.01)
*B32B 27/30* (2006.01)
*B32B 23/04* (2006.01)
*B32B 7/12* (2006.01)
*B32B 27/32* (2006.01)

(52) U.S. Cl.
CPC ....... *B32B 2250/24* (2013.01); *B32B 2250/40* (2013.01); *B32B 2255/10* (2013.01); *B32B 2255/20* (2013.01); *B32B 2255/26* (2013.01); *B32B 2264/0214* (2013.01); *B32B 2307/202* (2013.01); *B32B 2307/402* (2013.01); *B32B 2307/536* (2013.01)

(56) References Cited

U.S. PATENT DOCUMENTS

| 2005/0128379 | A1 | 6/2005 | Matsunaga et al. | |
| 2008/0247045 | A1* | 10/2008 | Suzuki | G02B 5/0278 |
| | | | | 359/601 |
| 2009/0080080 | A1* | 3/2009 | Takahashi | G02B 1/111 |
| | | | | 359/601 |
| 2009/0244708 | A1* | 10/2009 | Kameshima | G02B 5/0278 |
| | | | | 359/601 |
| 2012/0008206 | A1 | 1/2012 | Haga et al. | |
| 2014/0340755 | A1 | 11/2014 | Eguchi et al. | |
| 2017/0235025 | A1 | 8/2017 | Harada et al. | |
| 2017/0320306 | A1* | 11/2017 | Iwase | B32B 7/12 |

FOREIGN PATENT DOCUMENTS

| JP | 3790571 B2 | 6/2006 |
| JP | 2013-200332 A | 10/2013 |
| JP | 2016-053601 A | 4/2016 |
| JP | 2016-141050 A | 8/2016 |
| KR | 10-2004-0095353 | 11/2004 |
| WO | WO-2007/032170 A1 | 3/2007 |
| WO | WO-2012/164843 A1 | 12/2012 |
| WO | WO-2013/099931 A1 | 7/2013 |
| WO | WO-2016/010116 A1 | 1/2016 |
| WO | WO-2016/076322 A1 | 5/2016 |

OTHER PUBLICATIONS

International Searching Authority, "International Search Report," issued in connection with International Patent Application No. PCT/JP2017/035849, dated Oct. 31, 2017.

International Searching Authority, "Written Opinion," issued in connection with International Patent Application No. PCT/JP2017/035849, dated Oct. 31, 2017.

Office Action dated Jan. 20, 2021 for corresponding Chinese Patent Application No. 201780074925.2.

Notification of Reasons for Rejection issued in corresponding Japanese Patent Application No. 2018-554837 dated Feb. 1, 2022.

* cited by examiner

OPTICAL FILM, AND OPTICAL BARRIER FILM, COLOR CONVERSION FILM AND BACKLIGHT UNIT USING THE OPTICAL FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/035849, filed on Oct. 2, 2017, which is based upon and claims the benefit of priority to Japanese Patent Application No. 2016-236956, filed on Dec. 6, 2016; the disclosures of which are all incorporated herein by reference in their entireties.

TECHNICAL FIELD

The present disclosure relates to an optical film, and an optical barrier film, a color conversion film and a backlight unit using the optical film.

BACKGROUND ART

In electronic devices, such as liquid crystal displays, various optical films are used. PTL 1 describes an invention relating to a light diffusion sheet used for luminaires, illuminated signboards, rear projection screens, liquid crystal displays, or the like. The light diffusion sheet described in PTL 1 includes a light diffusing layer containing spherical particles of polymethyl methacrylate.

CITATION LIST

[Patent Literature] [PTL 1] JP 3790571 B2

SUMMARY OF THE INVENTION

Problem to be Improved or Solved by the Invention

In the invention described in PTL 1, a haze value (haze), which is an index of light diffusibility, tends to vary when the size of the spherical particles contained in the light diffusing layer varies greatly, or when the spherical particles have aggregated and formed secondary particles, or when the dispersibility in the light diffusing layer is poor. In this regard, the invention described in PTL 1 has room for improvement.

The present disclosure aims to provide an optical film having a haze value with sufficiently small in-plane variation, and an optical barrier film, a color conversion film and a backlight unit using the optical film.

Desired Improvement or Solution to Problem

An aspect of the present disclosure provides an optical film. The optical film includes a first film substrate, and a coating layer formed on the first film substrate. In the optical film, the coating layer contains a binder resin and fine particles with an average size in the range of 0.5 μm or more and 10.0 μm or less and a standard deviation in size that is less than ½ of the average size. According to this optical film, the fine particles of the coating layer have sufficiently small variation in size. More specifically, the fine particles have an average size within a predetermined range (0.5 μm or more and 10.0 μm or less) and a standard deviation in size that is less than ½ of the average size. Thus, in an optical film as provided, the coating layer has a haze value with sufficiently small in-plane variation. More specifically, the following issues can be improved or even solved.

In a production process of the optical film, the coating layer can be formed on the first film substrate such as by wet coating. Wet coating is a method of forming a coating layer through a step of applying a coating liquid, which contains a binder resin and fine particles dispersed in the binder resin, onto the first film substrate. If the fine particles contained in the coating liquid have a large variation in size (standard size deviation), greater size variations may be inevitably observed in the particle size distribution of the formed coating layer. If the fine particles as designed have a sufficiently small variation in size, but if the fine particles in the binder resin have poor dispersibility due to aggregation or the like of the fine particles, greater size variations than designed may be observed in the particle size distribution of the formed coating layer. Research conducted by the inventors of the present invention raises an issue that, when there is a large variation in size of the fine particles contained in the coating layer, the coating layer may exert unstable light diffusibility (haze value) (in-plane variation of the optical film may become greater).

In addition to the above issue, there is an issue of color conversion film performance affected by the thickness of the optical film. Specifically, the thickness of the optical film (and the thickness of the optical barrier film including the optical film) affects the coating thickness of the color conversion material, and this coating thickness may greatly affect the performance of the color conversion film. More specifically, when there is a large variation in size of the fine particles contained in the optical film, for example, large particles will protrude from the surface of the binder resin, and this protrusion may define the maximum thickness of the optical film, and may cause variation in performance of the color conversion film. According to the optical film of the present disclosure, these issues can be improved or even fully solved.

From the viewpoint of preventing separation of the fine particles from the coating layer (powder separation), the coating layer 14 may preferably have an arithmetic average roughness Ra of 0.4 μm or less.

From the viewpoint of preventing the coating layer from being damaged by a second member (e.g., prism sheet), or preventing the coating layer from damaging a second member (e.g., light guide plate), the coating layer may preferably have a hardness of H to 2H in terms of pencil hardness. Since the variation in size of the fine particles contained in the coating layer is sufficiently small, variation in pencil hardness of the coating layer can be made sufficiently small accordingly.

The fine particles may preferably have a hardness of 100 or less on the Rockwell R hardness scale. When the hardness of the fine particles is in the above range, damage of the coating layer and a second member can be minimized. The coating layer may preferably have a surface resistance of $1.0 \times 10^{13} \Omega/\square$ or less. When the surface resistance of the coating layer is in the above range, the coating layer may be suitably imparted with antistatic properties.

The present disclosure provides an optical barrier film according to a first aspect. This optical barrier film includes a barrier layer, and the above-described optical film. In the optical barrier film, the barrier layer is formed on a first film substrate-side surface of the optical film. The present disclosure provides an optical barrier film according to a second aspect. This optical barrier film includes a composite barrier layer including a second film substrate and a barrier layer, and the above-described optical film. In the optical barrier film, the composite barrier layer is formed on a first film substrate-side surface of the optical film. The optical barrier films of these aspects, which are provided with the above-described optical film, can each improve or even solve the issues set forth above, and can minimize the occurrence of blocking with a second member contacting therewith, while minimizing damage to the coating layer and the second member.

The optical barrier film may preferably include a vapor-deposited thin inorganic layer of silicon oxide expressed by $SiO_x$ ($1.0 \leq x \leq 2.0$). Since the barrier layer includes the vapor-deposited thin inorganic layer, the optical barrier film tends to exert improved barrier performance.

An aspect of the present disclosure provides a color conversion film. This color conversion film includes a color conversion layer, and two protective films disposed sandwiching the color conversion layer. In the color conversion film, at least one of the two protective films is the above-described optical barrier film; and the optical barrier film is disposed so that the coating layer faces away from the color conversion layer. This color conversion film, which includes the above-described optical barrier film, can improve or even solve the issues set forth above, and, for example, even when it is overlapped with a light guide plate configuring a backlight unit, can minimize damage of the light guide plate. Further, since the barrier layer itself is also prevented from being damaged, entry of air or water vapor into the color conversion layer is appropriately reduced. Thus, color conversion performance of the color conversion film is maintained over a long period of time.

An aspect of the present disclosure provides a backlight unit. This backlight unit includes a light source, a light guide plate, and the above-described color conversion film disposed on the light guide plate. In the backlight unit, the color conversion film is disposed so that the coating layer is in contact with the light guide plate. This backlight unit, which includes the above-described color conversion film, can improve or even solve the issues set forth above, and can minimize damage of the light guide plate with which the color conversion film is in contact. Since the barrier layer itself is also prevented from being damaged, entry of air or water vapor into the color conversion layer is appropriately reduced. Thus, good white light is provided by the backlight unit over a long period of time.

Advantageous Effects of the Invention

The present disclosure provides an optical film having a haze value with sufficiently small in-plane variation, and also an optical barrier film, a color conversion film and a backlight unit using the optical film.

BRIEF DESCRIPTION OF THE DRAWINGS

FIGS. 8A and 8B are a set of images in which FIG. 8A is an image of a coating layer of an optical film according to Example 2 as magnified by an optical microscope, and FIG. 8B is an image showing the circled portion of FIG. 8B at higher magnification.

DESCRIPTION OF REPRESENTATIVE EMBODIMENTS

Figure 1:
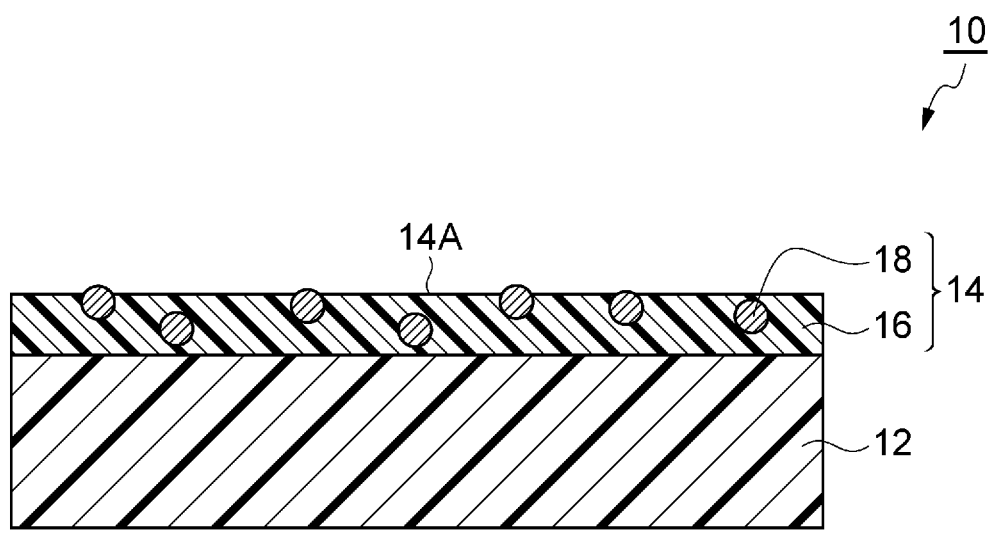
FIG. 1 is a schematic cross-sectional view illustrating an optical film according to an embodiment of the present disclosure.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

[Optical Film]

FIG. 1 is a schematic cross-sectional view illustrating an optical film according to an embodiment of the present disclosure. FIG. 1 shows an optical film 10 including a first film substrate 12 and a coating layer 14 formed on the first film substrate 12.

(Coating Layer)

The coating layer 14 serves as a layer diffusing light and may be referred to as a mat layer, or the like. The coating layer 14 contains fine particles 18. At least a part of the fine particles 18 protrudes from a surface of the coating layer 14 which is the surface facing away from the first film substrate 12. Since at least a part of the fine particles 18 in the coating layer 14 protrudes from the surface of the coating layer 14, the surface of the coating layer 14 can have asperities. Since the coating layer 14 has a surface of asperities which is the surface facing away from the first film substrate 12, that is, has an uneven surface 14A, if a second member is overlapped on the surface of the coating layer 14 of the optical film 10, blocking (adhesion) with the second member can be minimized. The expression that the fine particles 18 "protrude" from the surface of the coating layer 14 refers to that at least a part of the surfaces of the fine particles 18 is externally located with reference to portions of the surface of the coating layer 14 where there are no fine particles 18. The surfaces of the protruding fine particles 18 may be bare or may be covered with a binder resin or the like described later.

The fine particles 18 may have an average particle size of 0.5 μm or more and 10.0 μm or less, preferably 1.0 μm or more and 10.0 μm or less, and more preferably 2.0 μm or more and 8.0 μm or less. If the average particle size of the fine particles 18 is 0.5 μm or more, the occurrence of blocking may be easily reduced or prevented between the coating layer 14 and a second member contacting therewith. If the average particle size of the fine particles 18 is 10.0 μm or less, the protruded fine particles 18 can easily contribute to reducing the asperities of the surface of the coating layer 14, and thus can easily contribute to preventing a second member contacting the uneven surface 14A of the coating layer 14 from being damaged.

The fine particles 18 preferably have a standard deviation in size that is less than ½ of the average size thereof, more preferably less than ⅓, and even more preferably less than ¼. When this value is less than ½, the coating layer 14 will have a haze value with sufficiently small in-plane variation. The standard deviation in size of the fine particles 18 being less than ½ of the average size thereof implies that the number of excessively large size particles is very small. This may sufficiently prevent the optical film 10 from presenting a powdery appearance due to separation of large size particles after coating (powder separation) during production, or other issues of appearance. In addition to this, if the coating layer 14 is formed by wet coating, the thickness thereof can be controlled by adjusting the coating amount, which provides an advantage of enabling easy formation of a coating layer 14 with a desired thickness. From the viewpoint of production techniques of the fine particles 18, the lower limit of this value is about ⅕.

As described above, separation of the fine particles from the coating layer 14 (powder separation) can be well reduced or prevented if there are a fewer number of excessively large size particles in the coating layer 14. The number of large size particles in the coating layer 14 (whether powder separation is likely to occur) can be kept track by measuring an arithmetic mean roughness Ra of the coating layer 14. From the viewpoint of sufficiently reducing or preventing powder separation, the arithmetic mean roughness Ra of the coating layer 14 is preferably 0.4 μm or less, and more preferably 0.3 μm or less.

The pencil hardness of the coating layer 14 is preferably in the range of H to 2H. Since the size variation of the fine particles 18 contained in the coating layer 14 is sufficiently small, variation in pencil hardness of the coating layer 14 can be made sufficiently small accordingly. With the pencil hardness of the coating layer 14 being H or more, the coating layer 14 can be prevented from being damaged by a second member (e.g., prism sheet). With the pencil hardness of the coating layer 14 being 2H or less, the coating layer 14 can be prevented from damaging a second member (e.g., a light guide). The term pencil hardness as used herein refers to a value measured according to "Scratch hardness (pencil method)" of JIS K5600-5-4: 1999 (ISO/DIS 15184: 1996), i.e. a value measured by applying a load of 500 g to a pencil tip.

The coating layer 14 preferably has a thickness in the range of the 0.5 μm to 30 μm. The thickness of the coating layer 14 in the present specification is taken to be an average thickness thereof including the asperities. The thickness of the coating layer 14 is measured by a mass method according to JIS K5600. When the coating layer 14 has a thickness in this range, the fine particles 18 may easily protrude from the surface of the coating layer 14, and the uneven surface 14A may easily be formed on the coating layer 14.

The content of the fine particles 18 in the coating layer 14 is preferably in the range of 2 mass % to 80 mass %, and more preferably 5 mass % to 50 mass %, relative to the total amount of the coating layer 14. When the content of the fine particles 18 is 2 mass % or more, the fine particles 18 may easily protrude from the surface of the coating layer 14, and the occurrence of blocking may be easily minimized between the coating layer 14 and a second member contacting therewith. If the content of the fine particles 18 is 80 mass % or less, a second member contacting the uneven surface 14A of the coating layer 14 may be easily prevented from being damaged.

Of the fine particles 18 contained in the coating layer 14, the proportion of those which protruding from the surface of the coating layer 14 is preferably in the range of 10% to 100%, and more preferably 50% to 100%. When the proportion of protrusion of fine particles 18 is 10% or more, the occurrence of blocking may be easily minimized.

The fine particles 18 preferably have a hardness of 100 or less, and more preferably 90 or less, on the Rockwell R hardness scale. When the hardness of the fine particles 18 is 100 or less on the Rockwell R hardness scale, a second member contacting the uneven surface 14A of the coating layer 14 may be easily prevented from being damaged by the protruding fine particles 18. From the similar viewpoint, the fine particles 18 preferably have a hardness of 50 or less on the Rockwell M hardness scale.

The fine particles 18 are not particularly limited as long as they have a Rockwell hardness in the above range, and thus may be inorganic fine particles or may be organic fine particles. To keep the Rockwell hardness in the above range, it is preferable that the fine particles 18 are organic fine particles. Examples of the organic fine particles include polyolefin resins such as polypropylene, polyamide resins such as nylon, acryl urethane resins, styrene resins, urethane resins, benzoguanamine resins, silicone resins, and acrylic resins. The fine particles 18 are more preferably at least one kind of organic fine particles selected from the group consisting of polyolefin resins, polyamide resins, urethane resins, and silicone resins, and even more preferably polypropylene resin particles or urethane resin particles. When the fine particles 18 are organic fine particles, the fine particles 18 may easily become spherical, and control for smooth asperities may be easy. The fine particles 18 may include one kind of particles or a combination of two or more kinds of particles. In addition to the fine particles 18, the coating layer 14 may contain particles whose Rockwell hardness is out of the above range, as long as the advantageous effects of the present disclosure are not impaired.

The coating layer 14 may contain an electrically conductive material. When the coating layer 14 contains an electrically conductive material, the surface resistance of the coating layer 14 may tend to decrease. The surface resistance of the coating layer 14 is preferably $1.0 \times 10^{13} \Omega/\square$ or less. When the surface resistance of the coating layer 14 is $1.0 \times 10^{13} \Omega/\square$ or less, the coating layer 14 is suitably imparted with antistatic properties, and therefore adhesion or mingling of dust or the like to/into the coating layer 14 may tend to decrease. Thus, damage to the coating layer 14 or a second member due to dust may tend to decrease in the production process or the like of the backlight unit. Examples of the electrically conductive material include a quaternary ammonium salt compound, an electrically conductive polymer, and a metal oxide. These electrically conductive materials may be used singly or in combination of two or more.

The quaternary ammonium salt compound has a quaternary ammonium salt as a functional group in the molecules, and may, for example, be a (meth)acrylate compound having a quaternary ammonium salt as a functional group in the molecules. The (meth)acrylate compound having a quaternary ammonium salt as a functional group in the molecules may, for example, be a (meth)acrylic acid ester of a polyhydric alcohol having a quaternary ammonium salt as a functional group in the molecule (i.e. a quaternary ammonium salt (meth)acrylate ester compound), or a reaction product such as of a hydroxyalkyl ester of diisocyanate, a polyhydric alcohol, or a (meth)acrylic acid (i.e. a quaternary ammonium salt urethane (meth)acrylate compound). The quaternary ammonium salt compound may also be a polyether resin, a polyester resin, an epoxy resin, an alkyd resin, a spiroacetal resin, a polybutadiene resin, a polythiol polyene resin, or the like having an acrylate functional group. The quaternary ammonium salt comprises a quaternary ammonium cation and anion. Examples of the anion of the quaternary ammonium salt include $Cl^-$, $Br^-$, $I^-$, $F^-$, $HSO_4^-$, $SO_4^{2-}$, $NO_3^-$, $PO_4^{3-}$, $HPO_4^{2-}$, $H_2PO_4^-$, $SO_3^-$ and $OH^-$.

The electrically conductive polymer may be one or a mixture of two or more selected from polyacetylene, polyaniline, polythiophene, polypyrrole, polyphenylene sulfide, poly(1,6-heptadiyne), polybiphenylene (polyparaphenylene), polyparaphenylene sulfide, polyphenylacetylene, poly(2,5-thienylene), and derivatives thereof.

Examples of the metal oxide include zirconium oxide, antimony-containing tin oxide (ATO), phosphorus-containing tin oxide (PTO), tin-containing indium oxide, aluminum oxide, cerium oxide, zinc oxide, aluminum-containing zinc oxide, tin oxide, lithium salt, antimony-containing zinc oxide, and indium-containing zinc oxide.

The electrically conductive material preferably has a particle size for example, of 500 nm or less, and more preferably 100 nm or less. When the particle size of the electrically conductive material is 500 nm or less, even if particles with a Rockwell hardness that is out of the above range are used as the electrically conductive material, the surface resistance of the coating layer 14 may tend to decrease without impairing the effect of minimizing damage. The content of the electrically conductive material in the coating layer 14 is appropriately determined depending on the electrically conductive material so that the surface resistance of the coating layer 14 will be in the desired range. From the viewpoint of adhesion between the coating layer 14 and the first film substrate 12, the content of the electrically conductive material in the coating layer 14 may be 30 mass % or less.

In FIG. 1, the coating layer 14 further contains a binder resin 16. The binder resin 16 has good optical transparency, and may be obtained by molding a thermoplastic resin, or curing a thermosetting resin or a radiation curable resin. Examples of the resin forming the binder resin include polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, polyethylene resins, polystyrene resins, polyamide resins, polyimide resins, melamine resins, phenol resins, and silicone resins.

If the binder resin 16 is a cured product of a thermosetting resin, the cured product may be obtained by reacting a thermosetting resin with a curing agent. The binder resin 16 is preferably a cured product of a thermosetting resin having a hydroxyl group and an isocyanate curing agent. In this case, the isocyanate group of the isocyanate curing agent reacts with the hydroxyl group of the thermosetting resin to cure the thermosetting resin and the isocyanate curing agent.

From the viewpoint of achieving crosslinkage of polyol resin, the isocyanate curing agent is preferably an isocyanate curing agent having two or more isocyanate groups, and more preferably a diisocyanate curing agent having two isocyanate groups. Examples of the diisocyanate curing agent include aliphatic diisocyanates, such as hexamethylene diisocyanate and xylylene diisocyanate; aromatic diisocyanates such as toluene diisocyanate and diphenylmethane diisocyanate; and derivatives thereof.

The coating layer 14 is formed, for example, by applying a coating layer composition onto the first film substrate 12, followed by drying and curing, or molding, as necessary. The coating layer composition contains, for example, the above-described fine particles 18, an electrically conductive material, and a thermoplastic resin, a thermosetting resin or a radiation curable resin. The coating layer composition may further contain a solvent, a photopolymerization initiator, a leveling agent, or a lubricant. The coating layer composition may be applied to the first film substrate 12 using, for example, a roll coater, a reverse roll coater, a gravure coater, a micro gravure coater, a knife coater, a bar coater, a wire bar coater, a die coater, a dip coater, or the like.

When the coating layer composition contains a solvent, the coating film is dried by heating or blowing. In the case of heating, the drying temperature may, for example, be about 60° C. to 100° C., and the drying time may, for example, be about 10 seconds to 10 minutes. The solvent is mostly removed from the coating film by the drying.

When the coating layer composition contains a thermosetting resin, the dry-coating film is heated. The heating temperature may, for example, be about 50° C. to 100° C., and the heating time may, for example, be about 12 hours to 3 days. The coating film is cured by the heating.

When the coating layer composition contains a radiation curable resin, radiation is applied to the dry-coating film. The radiation may, for example, be ultraviolet radiation or electron radiation. The ultraviolet radiation may be emitted, for example, from a light source such as a high pressure mercury lamp, a low pressure mercury lamp, an extra high pressure mercury lamp, a metal halide lamp, a carbon arc, or a xenon arc. The electron radiation may be emitted, for example, from various types of electron beam accelerators such as Cockcroft-Walton type, Van de Graaff type, resonant transformer type, insulating core transformer type, linear type, Dynamitron type, high frequency type, or the like. The coating film is cured by the radiation irradiation.

(First Film Substrate)

The first film substrate 12 may, for example, be an organic polymer film. The first film substrate 12 may preferably be transparent, and may specifically have a total light transmittance of 80% or more. Examples of the first film substrate 12 may include polyolefin film substrates such as polyethylene and polypropylene, polyester film substrates such as polyethylene terephthalate and polyethylene naphthalate, cellulose film substrates such as triacetyl cellulose, diacetyl cellulose, and cellophane, polyamide film substrates such as 6-nylon and 6,6-nylon, acrylic film substrates such as polymethyl methacrylate, polystyrene film substrates, polyvinyl chloride film substrates, polyimide film substrates, polyvinyl alcohol film substrates, polycarbonate film substrates, and ethylene vinyl alcohol film substrates.

The first film substrate 12 preferably has a thickness in the range, for example, of 5 μm or more and 300 μm or less. When the thickness is 5 μm or more, the strength of the first film substrate 12 may be improved, tending, for example, to facilitate handling of the first film substrate 12 in the process or the like of producing a backlight unit. When the thickness is 300 μm or less, the first film substrate 12 may be handled easier in the film forming process through a roll-to-roll method.

[Optical Barrier Film]

First Embodiment

Figure 2:
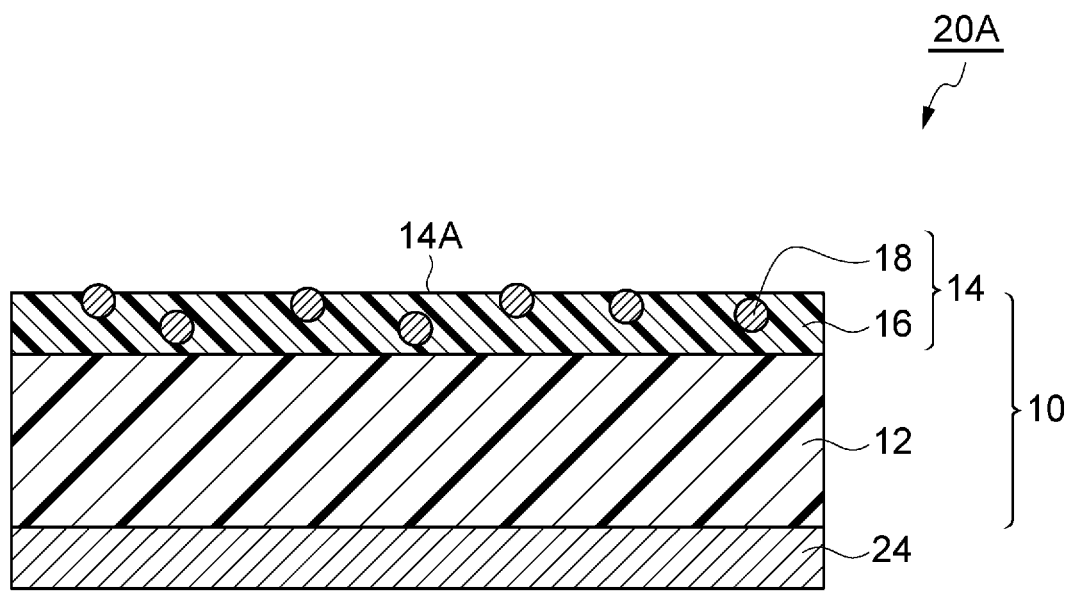
FIG. 2 is a schematic cross-sectional view illustrating an optical barrier film according to a first embodiment of the present disclosure.

FIG. 2 is a schematic cross-sectional view illustrating an optical barrier film according to a first embodiment of the present disclosure. FIG. 2 shows an optical barrier film 20A including a barrier layer 24 and an optical film 10. The barrier layer 24 is formed on a first film substrate 12-side surface of the optical film 10. In other words, the optical barrier film 20A includes a first film substrate 12, a coating layer 14 formed on one surface of the first film substrate 12, and the barrier layer 24 formed on the other surface of the first film substrate 12. As described above, the coating layer 14 has a haze value with sufficiently small in-plane variation. Therefore, the optical barrier film 20A can accordingly have a haze value with sufficiently small in-plane variation.

The optical film 10 has asperities on the coating layer 14-side surface, or has an uneven surface 14A. Thus, when a second member is overlapped on the optical film 10 (coating layer 14) of the optical barrier film 20A, blocking with the second member may be minimized. If the optical barrier film 20A is overlapped on a second member, the protruding fine particles 18 can prevent damage of the coating layer 14 and the second member contacting the uneven surface 14A of the coating layer 14. It should be noted that the barrier layer 24 may be formed on the first film substrate 12-side surface of the optical film 10 via an adhesive layer.

The barrier layer 24 is capable of shutting off entry of gas. The barrier layer 24 preferably includes a thin inorganic layer. It is preferable that the thin inorganic layer contains an inorganic compound and also contains a metal or a metal oxide. Examples of the metal include aluminum, copper, and silver. The metal oxide may, for example, be at least one metal oxide selected from the group consisting of an yttrium tantalum oxide, an aluminum oxide, a silicon oxide, a magnesium oxide, or the like. Of these oxides, a silicon oxide is preferable due to low cost and high barrier properties of blocking entry of water vapor or the like. The silicon oxide is expressed by $SiO_x$ where x is preferably 1.5 or more and 2.0 or less. When x is 1.5 or more, or preferably 1.7 or more, the transparency tends to improve. When x is 2.0 or less, the barrier properties tend to be improved. The thin inorganic layer is formed, for example, by vapor deposition or sputtering. Preferably, the thin inorganic layer may be formed by vapor deposition. The thin inorganic layer preferably has a thickness in the range of 10 nm to 300 nm, and more preferably 20 nm to 100 nm. When the thickness of the thin inorganic layer is 10 nm or more, a homogeneous film may tend to be easily obtained, and gas barrier properties may tend to be easily obtained. When the thickness of the thin inorganic layer is 300 nm or less, flexibility of the thin inorganic layer may tend to be maintained, and cracking or the like may be less likely to occur in the layer, after being formed, due to an external force such as bending or pulling.

The barrier layer 24 may include a gas barrier coating layer. The gas barrier coating layer is preferably formed of a composition containing at least one selected from the group consisting of a metal alkoxide expressed by the following Formula (1) and a hydrolyzate thereof.

$$M(OR^1)_m(R^2)_{n-m} \quad (1)$$

In Formula (1), $R^1$ and $R^2$ are each independently a monovalent organic group having 1 to 8 carbon atoms, and may preferably be an alkyl group such as a methyl group or an ethyl group. M represents an n-valent metal atom such as Si, Ti, Al or Zr. m represents an integer from 1 to n. Examples of the metal alkoxide include tetraethoxysilane $[Si(OC_2H_5)_4]$ and triisopropoxy aluminum $[Al(O\text{-iso-}C_3H_7)_3]$. The metal alkoxide is preferably tetraethoxysilane or triisopropoxy aluminum since they are relatively stable in aqueous solvent after being hydrolyzed. Examples of the hydrolyzate of the metal alkoxide include silicic acid $(Si(OH)_4)$ which is a hydrolyzate of tetraethoxysilane, and aluminum hydroxide $(Al(OH)_3)$ which is a hydrolyzate of tripropoxy aluminum. These materials may be used singly or in combination of two or more.

The composition may further contain a hydroxyl group-containing polymer compound. Examples of the hydroxyl group-containing polymer compound include water-soluble polymers such as polyvinyl alcohol, polyvinyl pyrrolidone and starch. From the viewpoint of barrier properties, the hydroxyl group-containing polymer compound is preferably polyvinyl alcohol. These materials may be used singly or in combination of two or more. The content of the hydroxyl group-containing polymer compound in the composition may, for example, be in the range of 10 mass % to 90 mass %.

The gas barrier coating layer preferably has a thickness in the range of 50 nm to 1,000 nm, and more preferably 100 nm to 500 nm. When the thickness of the gas barrier coating layer is 50 nm or more, more sufficient gas barrier properties may tend to be obtained, and when 1,000 nm or less, sufficient flexibility may tend to be maintained.

If the barrier layer 24 includes both the thin inorganic layer and the gas barrier coating layer, the thin inorganic layer may be formed on the surface of the first film substrate 12, and the gas barrier coating layer may be formed on the surface of the thin inorganic layer.

Second Embodiment

Figure 3:
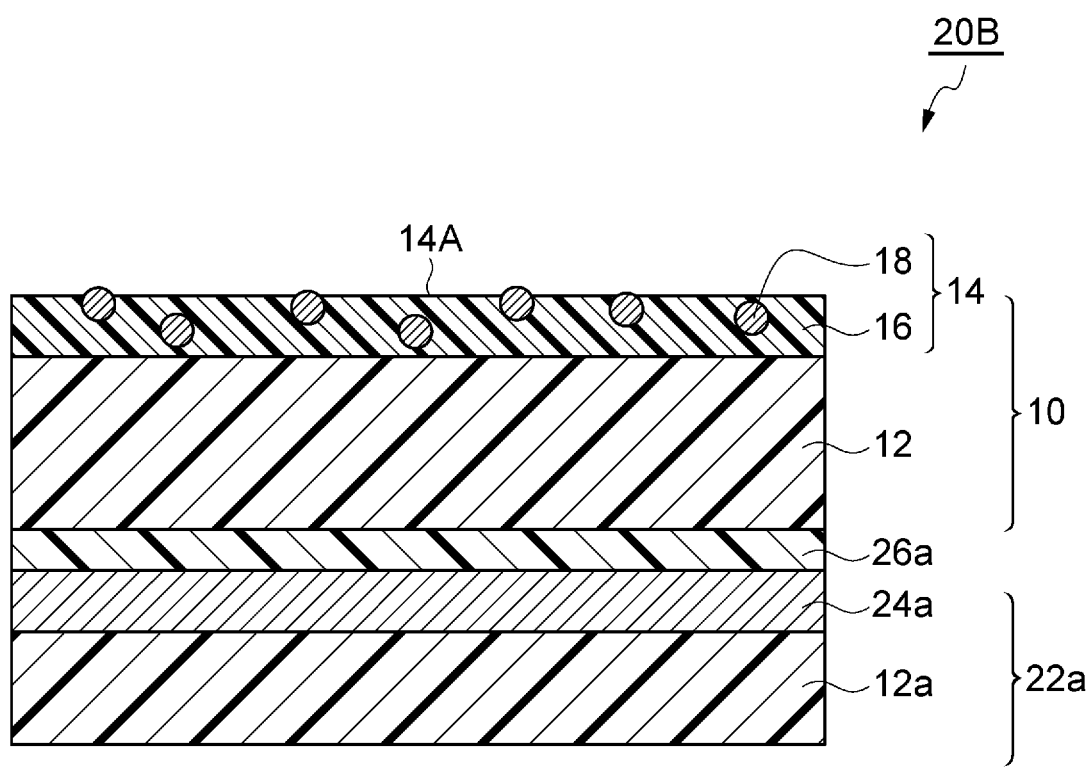
FIG. 3 is a schematic cross-sectional view illustrating an optical barrier film according to a second embodiment of the present disclosure.

FIG. 3 is a schematic cross-sectional view illustrating an optical barrier film according to a second embodiment of the present disclosure. FIG. 3 shows an optical barrier film 20B is provided with a composite barrier layer 22a including a second film substrate 12a and a barrier layer 24a, and an optical film 10. The composite barrier layer 22a is formed on the optical film 10 via an adhesive layer 26a in such a manner that the first film substrate 12 and the barrier layer 24a face each other.

Since the optical barrier film 20B is provided with the composite barrier layer 22a including the second film substrate 12a, an optical barrier film is realized with impartment of good water vapor barrier properties and oxygen barrier properties, and ability of further reducing damage to the barrier layer or the like. The material of the second film substrate 12a may be the same as that of the first film substrate 12. The second film substrate 12a preferably has a thickness in the range, for example, of 5 μm or more and 50 μm or less. When the thickness of the second film substrate 12a is 5 μm or more, the strength of the second film substrate 12a may be improved, and thus, for example, the second film substrate 12a may tend to be handled easier in the process or the like of producing a backlight. When the thickness of the second film substrate 12a is 50 μm or less, deterioration in barrier properties may be prevented, which would otherwise be caused by the entry of water vapor or oxygen from the end faces of the substrate.

The adhesive layer 26a is formed of an adhesive or a tackifier. The adhesive may be an acrylic adhesive, an epoxy adhesive, a urethane adhesive, or the like. The adhesive preferably contains an epoxy resin. When the adhesive contains an epoxy resin, adhesion between the optical film 10 and the composite barrier layer 22a may be improved. The tackifier may be an acrylic tackifier, a polyvinyl ether tackifier, a urethane tackifier, a silicone tackifier, a starch paste adhesive, or the like. The adhesive layer 26a preferably has a thickness in the range of 0.5 μm to 50 μm, more preferably 1 μm to 20 μm, and even more preferably 2 μm to 6 μm. When the thickness of the adhesive layer 26a is 0.5 μm or more, adhesion between the optical film 10 and the composite barrier layer 22a may tend to be easily obtained, and when 50 μm or less, better gas barrier properties may tend to be easily obtained.

The optical barrier film 20B of the second embodiment may be obtained by, for example, forming a barrier layer 24a on a second film substrate 12a to produce a composite barrier layer 22a separately from the optical film 10, and then bonding the optical film 10 and the composite barrier layer 22a together, followed by aging as necessary. The method of producing the optical barrier film 20B of the second embodiment is not limited to the above method.

Third Embodiment

Figure 4:
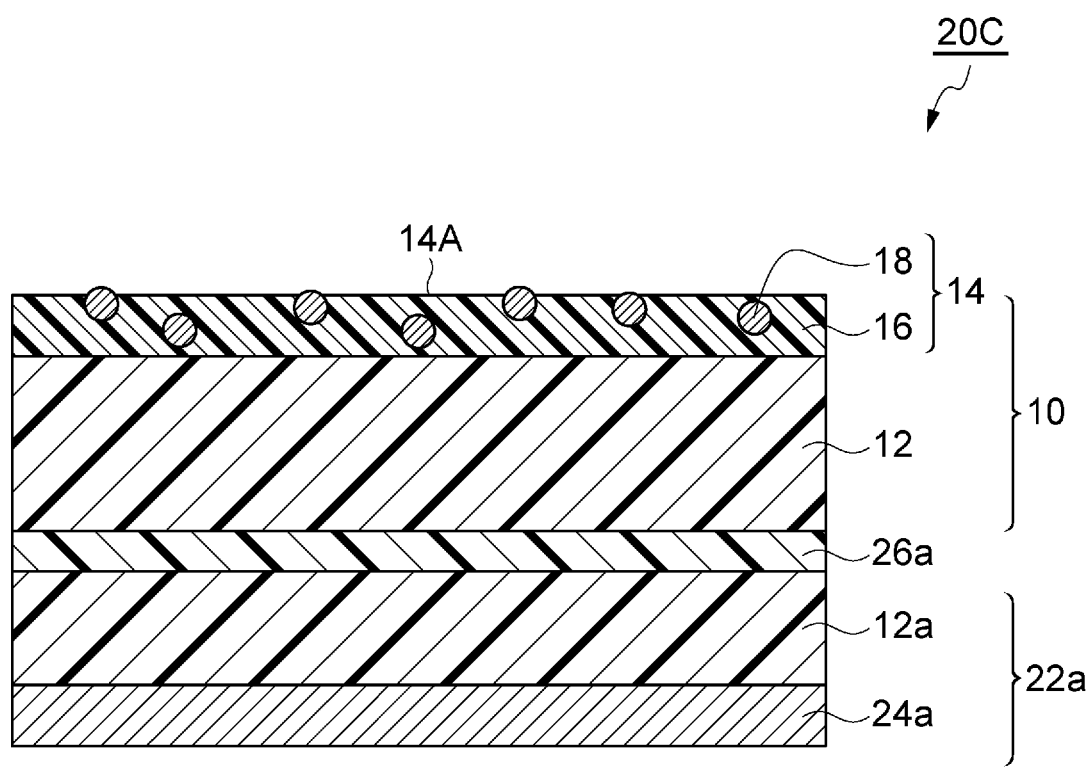
FIG. 4 is a schematic cross-sectional view illustrating an optical barrier film according to a third embodiment of the present disclosure.

FIG. 4 is a schematic cross-sectional view illustrating an optical barrier film according to a third embodiment of the present disclosure. FIG. 4 shows an optical barrier film 20C provided with a composite barrier layer 22a including a second film substrate 12a and a barrier layer 24a, and an optical film 10. The composite barrier layer 22a is formed on the optical film 10 via an adhesive layer 26a in such a manner that the first film substrate 12 and the second film substrate 12a face each other.

Fourth Embodiment

Figure 5:
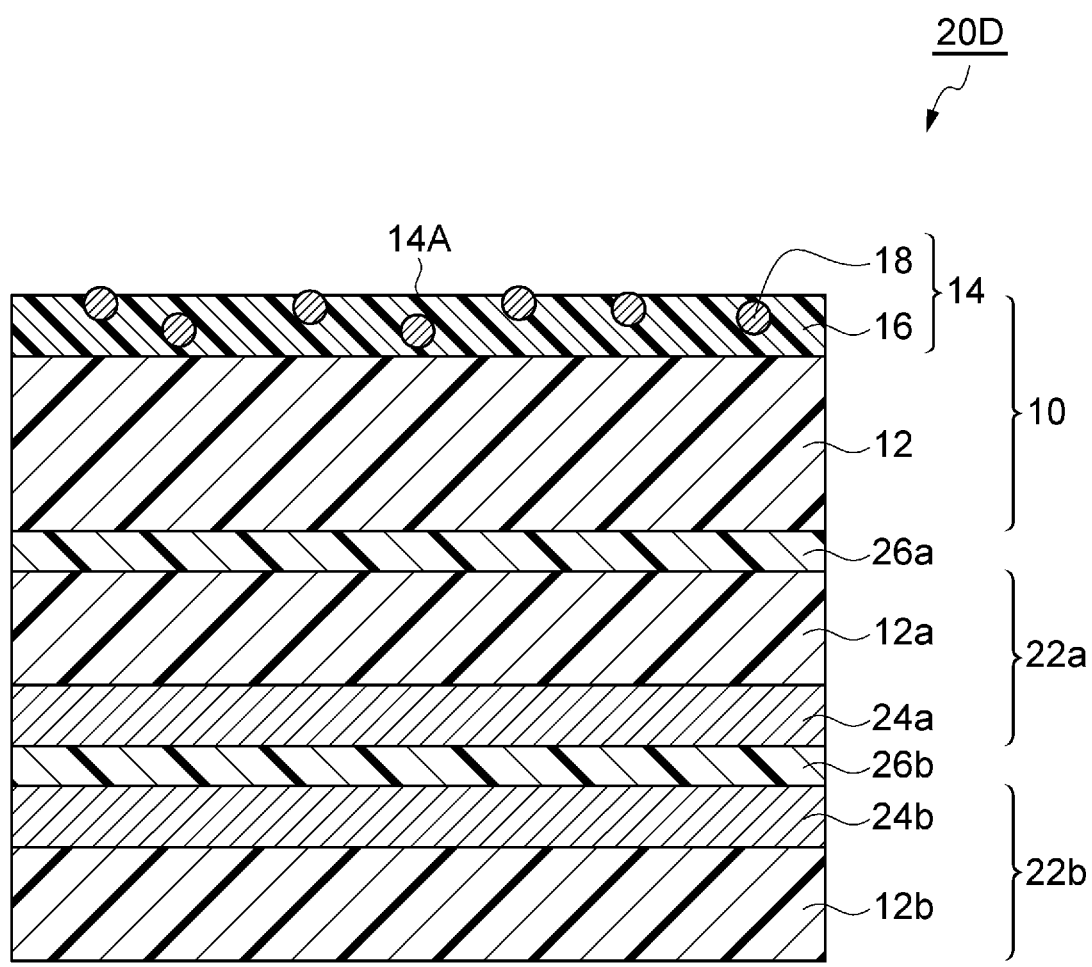
FIG. 5 is a schematic cross-sectional view illustrating an optical barrier film according to a fourth embodiment of the present disclosure.

FIG. 5 is a schematic cross-sectional view illustrating an optical barrier film according to a fourth embodiment of the present disclosure. FIG. 5 shows an optical barrier film 20D provided with a composite barrier layer 22a including a second film substrate 12a and a barrier layer 24a, a composite barrier layer 22b including a third film substrate 12b and a barrier layer 24b, and an optical film 10. The composite barrier layer 22a is formed on the optical film 10 via an adhesive layer 26a such that the first film substrate 12 and the second film substrate 12a face each other. The composite barrier layer 22b is formed on the composite barrier layer 22a via adhesive layer 26b such that the barrier layer 24a and the barrier layer 24b face each other.

[Color Conversion Film]

Figure 6:
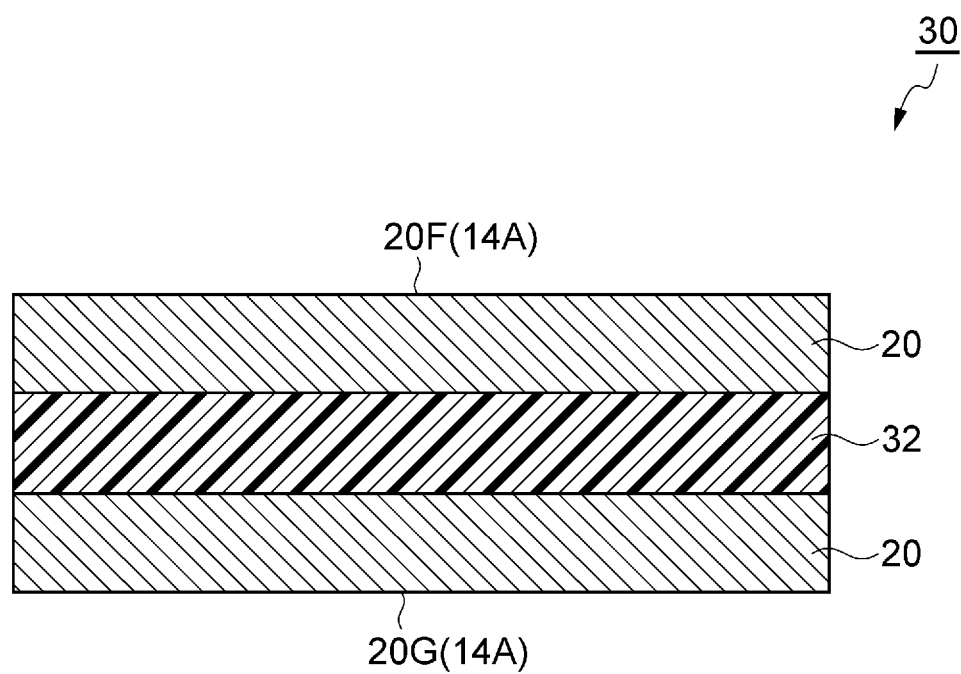
FIG. 6 is a schematic cross-sectional view illustrating a color conversion film according to an embodiment of the present disclosure.

FIG. 6 is a schematic cross-sectional view illustrating a color conversion film according to an embodiment of the present disclosure. The color conversion film is capable of converting the wavelength of a part of light emitted from the light source of the backlight unit for a liquid crystal display. FIG. 6 shows a color conversion film 30 including a color conversion layer 32, and optical barrier films 20 disposed sandwiching the color conversion layer 32. Each optical barrier film 20 may be any one of the optical barrier films 20A, 20B, 20C, and 20D described above. The two optical barrier films 20 may have the same structure or may have different structures. Each optical barrier film 20 is disposed on the color conversion layer 32 such that the coating layer 14 will face away from the color conversion layer 32. Thus, the color conversion film 30 has uneven surfaces 20F and 20G each derived from the uneven surface 14A of the coating layer 14. As described above, due to the sufficiently small variation in size of the fine particles contained in the coating layer 14 of the optical barrier film 20, variation in performance of the color conversion film 30 can be made sufficiently small accordingly.

Since the uneven surfaces 20F and 20G are provided on the surfaces of the color conversion film 30, when a second member is overlapped on the uneven surface 20F or 20G of the color conversion film 30, blocking with the second member is minimized. In addition, even when the color conversion film 30 is overlapped, for example, on a light guide configuring the backlight unit, the light guide can be prevented from being damaged by the protruding fine particles 18. Further, since the barrier layer itself is also prevented from being damaged, entry of air or water vapor into the color conversion layer 32 is appropriately reduced. Thus, color conversion performance of the color conversion film 30 is maintained over a long period of time.

The color conversion film according to the present disclosure should not be limited to the above embodiments. Although FIG. 6 shows an example of a color conversion film 30 with a structure in which a color conversion layer 32 is sandwiched between two optical barrier films 20 (protective films), one of the two protective films sandwiching the color conversion layer 32 may be an optical barrier film 20, and the other may be a protective film with a different structure.

The color conversion layer 32 contains a resin and a phosphor. The color conversion layer 32 has a thickness of several tens of μm to several hundreds of μm. The resin may, for example, be a photocurable resin or a thermosetting resin. The color conversion layer 32 preferably contains two kinds of phosphors comprising luminescent nanocrystals (quantum dots). The color conversion layer 32 may be a laminate of two or more phosphor layers each containing a different kind of phosphor. For the two kinds of phosphors, ones having the same excitation wavelength are selected. The excitation wavelength is determined based on the wavelength of light emitted from the light source of the backlight unit. The fluorescent colors of the two kinds of phosphors are different from each other. When a blue light emitting diode (blue LED) is used as the light source, the fluorescent colors are red and green. The wavelength of fluorescence of each phosphor and the wavelength of light emitted from the light source are determined based on the spectral characteristics of the color filter. The peak wavelength of the fluorescence may, for example, be 610 nm for red and 550 nm for green.

Next, the particle structure of the phosphor will be described. As the phosphor, core-shell luminescent nanocrystals with particularly good luminous efficiency may be used. The core-shell luminescent nanocrystals are prepared, for example, from a material containing an inorganic material, preferably a material containing an inorganic conductor or semiconductor material.

Examples of the semiconductor material include the II-VI, III-V, IV-VI, and IV semiconductor compounds. More specifically, examples of the semiconductor material include Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2(S, Se, Te)_3$, and $Al_2CO$, which are used singly or in combination of two or more.

The nanocrystals may include, for example, a p- or n-type dopant. The nanocrystals may include, for example, a II-VI or III-V semiconductor. For example, II-VI semiconductor nanocrystals comprise any combination of a group II element such as Zn, Cd or Hg, and a group VI element such as S, Se, Te or Po. For example, III-V semiconductor nanocrystals comprise any combination of a group III element such as B, Al, Ga, In or Tl, and a group V element such as N, P, As, Sb or Bi.

The core-shell luminescent nanocrystals have a semiconductor crystal core as a light emitting part covered with a shell as a protective film. For example, cadmium selenide (CdSe) can be used for the core and zinc sulfide (ZnS) can be used for the shell. Since the surface defects of the CdSe particles are covered with ZnS having a large band gap, the quantum yield is improved. Further, the phosphor may have a structure in which the core is doubly covered with a first shell and a second shell. In this case, CdSe can be used for the core, zinc selenide (ZnSe) can be used for the first shell, and ZnS can be used for the second shell.

The color conversion layer 32 may have a single layer structure in which all the phosphors are dispersed in a single layer, or may have a multilayer structure in which phosphors are dispersed in respective multiple layers and these layers are laminated with each other.

Next, a method of producing the color conversion film 30 of the present embodiment will be described. The method of forming the color conversion layer 32 may, for example, be one described in the specification of JP 2013-544018 T, although it is not particularly limited. The color conversion film 30 may be produced by dispersing a phosphor in a binder resin, applying the prepared phosphor dispersion onto the surface of an optical barrier film 20 (first protective film) which is the surface facing away from the coating layer 14, and bonding another optical barrier film 20 (second protective film) to the coated surface such that the coating layer 14 faces away from the color conversion layer 32, followed by curing the color conversion layer 32.

[Backlight Unit]

Figure 7:
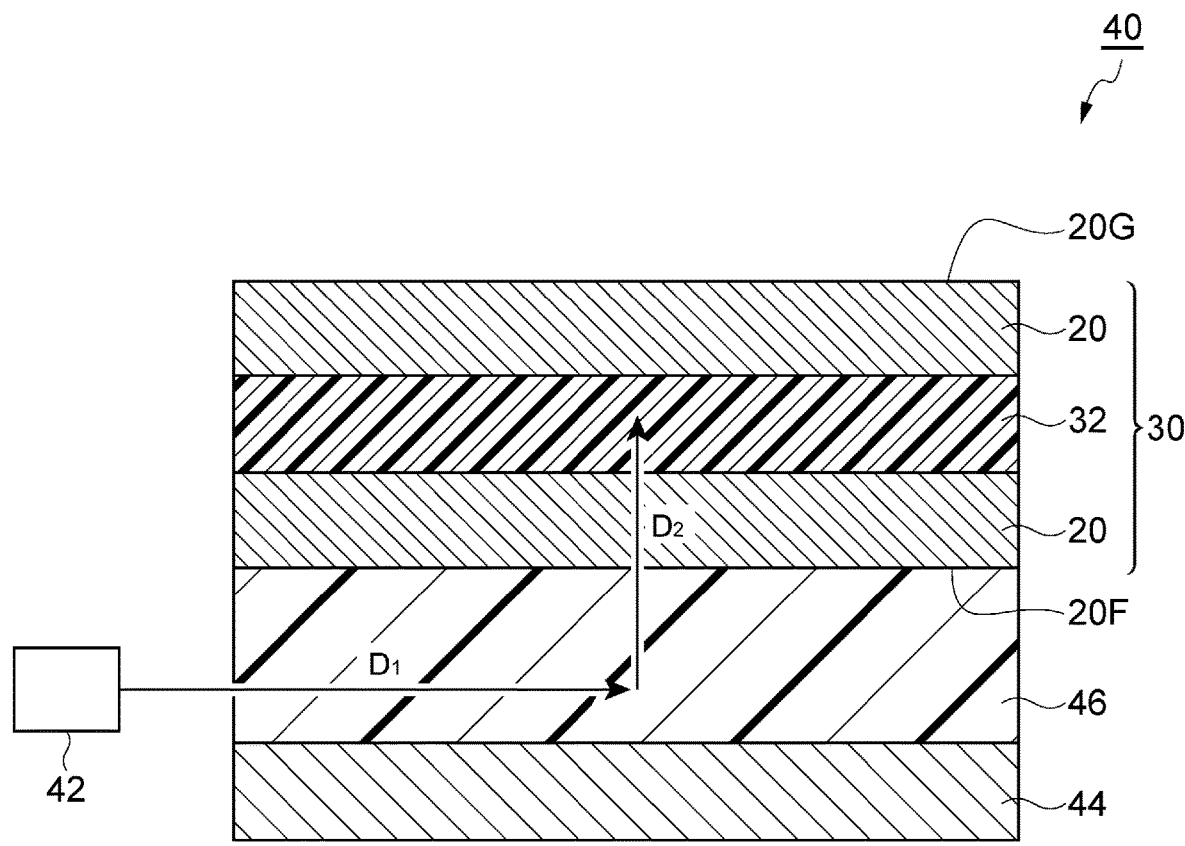
FIG. 7 is a schematic cross-sectional view illustrating a backlight unit according to an embodiment of the present disclosure.

FIG. 7 is a schematic cross-sectional view illustrating a backlight unit according to an embodiment of the present disclosure. FIG. 7 shows a backlight unit 40 including a light source 42, a light guide plate 46, and a color conversion film 30 disposed on the light guide plate 46. The color conversion film 30 is disposed so that the uneven surface 20F (i.e. the uneven surface 14A of the coating layer 14) is in contact with the light guide plate 46. Specifically, in the backlight unit 40, the light guide plate 46 and a reflecting plate 44 are placed in this order on the uneven surface 20F of the color conversion film 30, and the light source 42 is disposed beside the light guide plate 46 (toward the face of the light guide plate 46). Since the backlight unit 40 includes the color conversion film 30 having a performance with sufficiently small in-plane variation, the variation of performance (coloring, luminance, etc.) of the backlight unit 40 may be sufficiently reduced. The backlight unit 40 can reduce or prevent damage to the light guide plate 46 contacting the color conversion film 30. Since the barrier layer itself is prevented from being damaged, entry of air or water vapor into the color conversion layer is appropriately reduced. Thus, good white light is provided by the backlight unit over a long period of time.

The light guide plate 46 and the reflecting plate 44 play a role of efficiently reflecting and guiding light emitted from the light source 42. Known materials may be used for these components. Examples of the material of the light guide plate 46 include acrylic films, polycarbonate films, and cycloolefin films. Materials used for the light guide plate 46 are unlikely to have high hardness and thus tend to be damaged through contact with a second member. Polycarbonate, in particular, which is generally used for light guide plates because of its high transparency and ease of processing, has low surface hardness and is easily damaged. The light source 42 includes, for example, a plurality of blue light emitting diode elements. The light emitting diode elements may be violet light emitting diodes, or may be light emitting diodes with an even lower wavelength. The light emitted from the light source 42 enters the light guide plate 46 (direction $D_1$), and then enters the color conversion layer 32 (direction $D_2$) with reflection, refraction, or the like. The light that has passed through the color conversion layer 32 becomes white light as a result of the color prior to passage therethrough being mixed with yellow light generated in the color conversion layer 32.

EXAMPLES

The invention according to the present disclosure will be specifically described by way of examples. However, the scope of the invention according to the present disclosure should not be limited to these examples.

(Components to be Used)

The following components were used for preparing the coating layer compositions (coating solutions) of Examples 1 to 5 and Comparative Example 1.

Main resin 1: Admixture of urethane fine particles (average size 6.20 μm, standard deviation in size 2.25 μm) and a transparent material (manufactured by DIC Graphics Corporation)

Main resin 2: Admixture of urethane fine particles (average size 7.46 μm, standard deviation in size 13.39 μm) and a transparent material (manufactured by DIC Graphics Corporation)

Transparent material: Varnish (manufactured by DIC Graphics Corporation) for adjusting concentration of the fine particles of the main resins 1 and 2

Curing agent: Isocyanate curing agent (manufactured by DIC Graphics Corporation)

Antistatic agent: Resistat PU-101 (trade name, manufactured by DKS Co., Ltd.)

Solvent: Toluene (manufactured by Wako Pure Chemical Industries, Ltd., Cica first grade)

(Measurement of Physical Properties of Fine Particles Contained in Main Resins 1 and 2)

The average size and the standard size deviation of the fine particles contained in the main resins 1 and 2 were measured as follows. Specifically, the main resins were each placed in a glass bottle, and shaken 100 times, followed by addition of ethyl acetate. Samples thus obtained were measured in terms of average size and standard deviation in size of the fine particles contained therein by using a laser diffraction/scattering type particle size distribution measuring device (Microtrac MT 3300 (trade name), Nikkiso Co., Ltd.). The results are shown in Table 1.

TABLE 1

| Physical properties of fine particles contained in main resin | Main resin 1 | Main resin 2 |
|---|---|---|
| Average particle size | 6.20 μm | 7.46 μm |
| Standard size deviation | 2.25 μm | 13.39 μm |

(Preparation of Optical Film)

A coating layer composition obtained by mixing the materials formulated in Table 2 was applied onto the first film substrate to form a coating film with a wire bar coater. Then, the coating film was heated at 80° C. for 30 seconds for drying. The dried coating film was then aged at 60° C. for 2 days. Thus, optical films of Examples 1 to 5 and Comparative Example 1 were prepared. In Examples 1 to 5, when forming a coating film of the coating layer composition, the coating amount was varied by using wire bars with different numbers (diameters) so that coating layers with different thicknesses were formed on the respective first film substrates.

TABLE 2

| Component | Examples 1 to 5 | Comparative Example 1 |
|---|---|---|
| Main resin 1 | 13.52 g | — |
| Main resin 2 | — | 13.52 g |
| Transparent material | 4.62 g | 4.62 g |
| Curing agent | 0.88 g | 0.88 g |
| Antistatic agent | 0.64 g | 0.64 g |
| Solvent | 10.35 g | 10.35 g |
| Total | 30 g | 30 g |

The optical films of the above examples and comparative example were evaluated in terms of the following items. The results are shown in Table 3.

(Haze and Total Light Transmittance)

Haze and total light transmittance of the optical films of the examples and comparative example were measured using a haze meter (turbidimeter) NDH-2000 (trade name, manufactured by Nippon Denshoku Industries Co., Ltd.).

(Damage Prevention Performance)

The optical films obtained in the examples and comparative example were each cut into a size of 4 cm×4 cm. The cut optical film was overlapped on a polycarbonate film such that the coating layer of the optical film contacted the polycarbonate film, and then the resultant object was left standing for 30 seconds at room temperature with a load of 25 kgf/cm² being applied thereto. After that, the optical film and the polycarbonate film were observed both visually and microscopically to evaluate damage prevention performance, based on the following criteria. It should be noted that the polycarbonate film was prepared emulating the light guide plate of a backlight unit. The polycarbonate film had a thickness of 188 μm.

A: Damage was observed neither on the coating layer of the optical film nor on the polycarbonate film.

B: Damage was observed on either or both of the coating layer of the optical film and the polycarbonate film.

C: Severe damage was observed on either or both of the coating layer of the optical film and the polycarbonate film.

(Surface Resistance)

Surface resistance of the coating layer of the optical film obtained in each of the examples and comparative example was measured according to JIS-K6911 (applied voltage: 500 V, time: 10 s, probe: URS, under environment of 23° C. 55% RH) using a high resistance resistivity meter (trade name: Hiresta UP MCP-HT 450, manufactured by Dia Instruments Co., Ltd.).

TABLE 3

| | Ex. 1 | Ex. 2 | Ex. 3 | Ex. 4 | Ex. 5 | Comp. Ex. 1 |
|---|---|---|---|---|---|---|
| Wire bar No. | #4 | #6 | #8 | #10 | #14 | #10 |
| Coating amount [g/cm²] | 0.89 | 1.92 | 2.62 | 3.25 | 4.46 | 2.53 |
| Coating thickness [μm] | 4.0 | 4.5 | 5.0 | 5.4 | 6.0 | 6.0 |
| Haze value | 31.8 | 44.0 | 50.1 | 58.2 | 70.5 | 40.3 |
| Total light transmittance [%] | 88.6 | 88.8 | 89.3 | 89.8 | 90.7 | 88.9 |
| Damage prevention performance | B+ | B+ | B+ | B+ | B+ | B+ |
| Surface resistance [10¹⁰ Ω/□] | 315.9 | 6.5 | 26.3 | 15.8 | 9.4 | 7.0 |

As shown in Table 3, the optical film of Example 2 (coating thickness: 4.5 μm) had a haze value of 44.0%, whereas the optical film of Comparative Example 1 (coating thickness: 6.0 μm) had a haze value of 40.3%. These haze values were relatively close. As set forth below, haze was measured at a plurality of portions of each of the optical films of Example 2 and Comparative Example 1 to evaluate in-plane variation of haze. Also, physical properties (average size and standard deviation in size) of the fine particles contained in these coating layers were measured.

(Evaluation of In-Plane Variation Haze)

The optical films of Example 2 and Comparative Example 1 were each cut into a 100 mm square to prepare samples. Each sample was subjected to haze measurement at a total of 5 portions (measurement points 1 to 5), i.e. at the center and four corners thereof. From these measured values, an average value of haze and a standard deviation of haze were calculated. The results are shown in Table 4.

TABLE 4

| | | Ex. 2 | Comp. Ex. 1 |
|---|---|---|---|
| Haze measurement value | Measurement point 1 | 43.9 | 39.9 |
| | Measurement point 2 | 44.2 | 40.6 |
| | Measurement point 3 | 44.1 | 41.4 |
| | Measurement point 4 | 44.3 | 39.7 |
| | Measurement point 5 | 44.3 | 40.1 |
| Average of haze measurement values | | 44.2 | 40.3 |
| Standard deviation of haze measurement values | | 0.2 | 0.7 |

(Measurement of Physical Properties of Fine Particles Contained in Coating Layer)

Figure 8A:
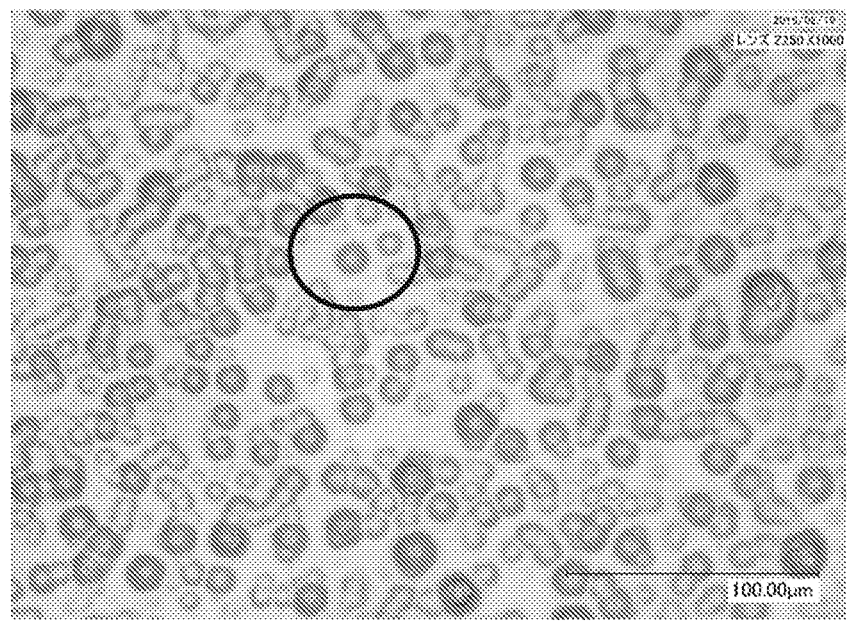
Figure 8B:
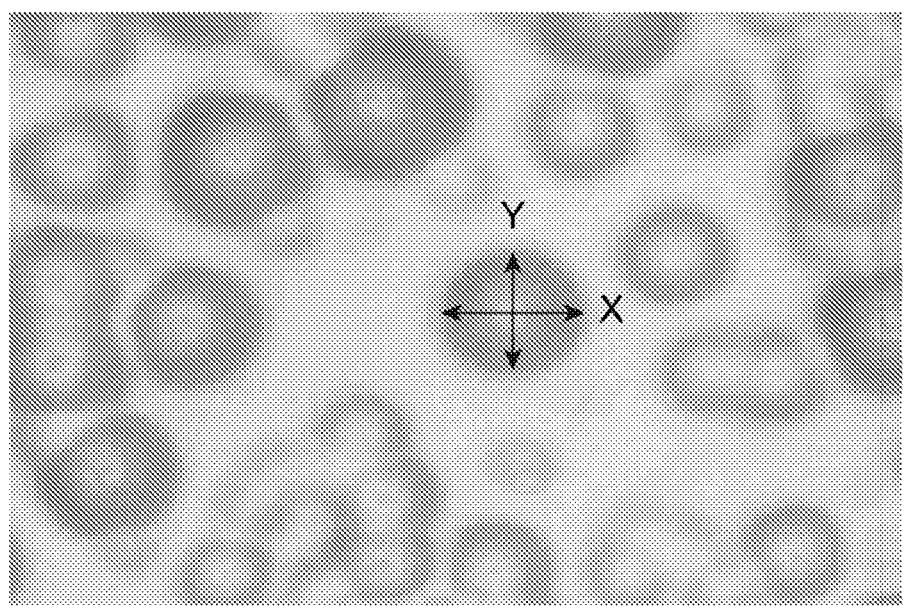

The coating layers of Example 2 and Comparative Example 1 were measured as follows in terms of average size and standard deviation in size of the fine particles contained therein. Specifically, each optical film of Example 2 and Comparative Example 1 was magnified 1,000 times with an optical microscope (see FIG. 8A), and the diameters of 50 randomly extracted fine particles were measured. As shown in FIG. 8B, the length (X) in the lateral direction and the length (Y) in the longitudinal direction were measured, and the average (=(X+Y)/2) was taken to be the diameter of the particle. Table 5 shows average size and standard deviation in size of the fine particles, as calculated from these measured values. FIG. 8A is a magnified image of the coating layer of the optical film of Example 2 as observed through an optical microscope, and FIG. 8B is an even more magnified image of the particle circled in FIG. 8A.

TABLE 5

| Physical property of fine particles contained in coating layer | Ex. 2 | Comp. Ex. 1 |
|---|---|---|
| Average particle size | 10.1 μm | 6.5 μm |
| Standard size deviation | 2.4 μm | 4.1 μm |

(Measurement of Arithmetic Mean Roughness Ra of Coating Layer)

The optical films of Example 2 and Comparative Example 1 were measured in terms of the arithmetic mean roughness Ra of the coating layers. For the measurement, a noncontact surface layer cross section measurement system (VertScan, manufactured by Ryoka Systems) was used. The results were as follows.

Example 2: 0.27 μm

Comparative Example 1: 0.42 μm (Evaluation of Amount of Fine Particles Separated from Coating Layer)

Figure 9:
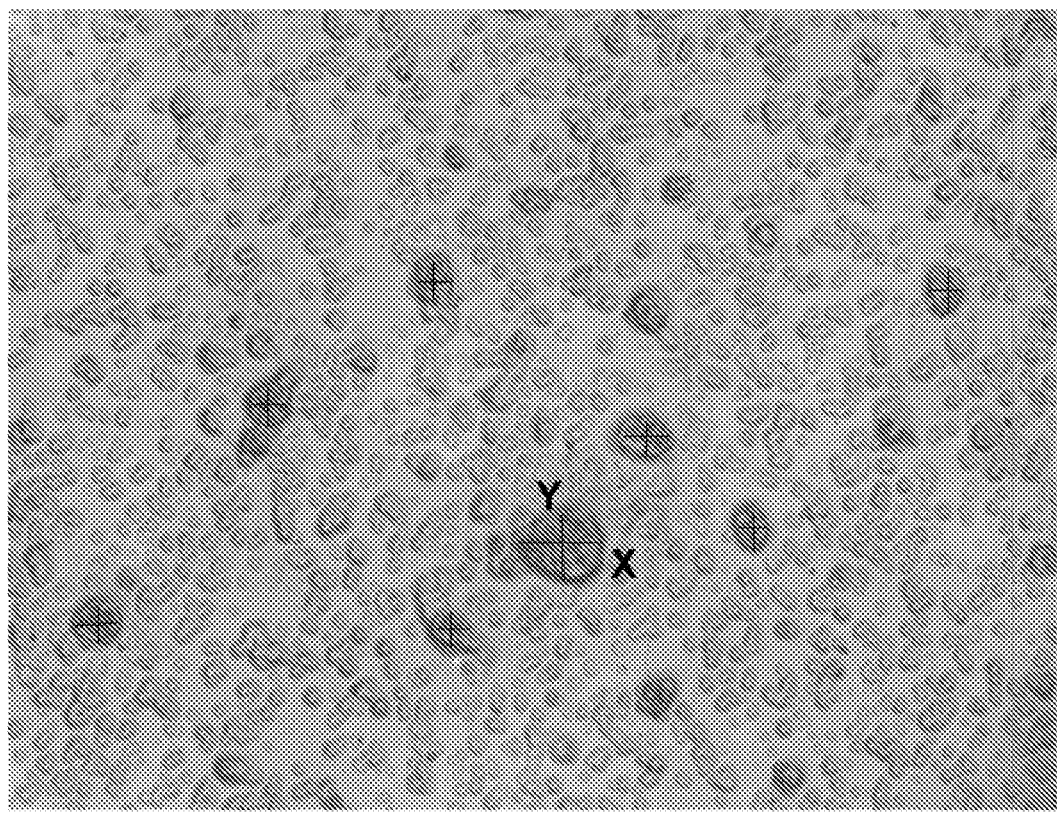
FIG. 9 is an optical microscopic image showing the coating layer of the optical film of Example 2 with indication of portions from which fine particles are recognized to have separated.

Surface portions of a coating layer of the optical film of Example 2 were rubbed against each other. Then, magnifying these surface portions with an optical microscope, the number of spots where the particles were recognized to have separated due to the rubbing was counted. 8 spots of separation were found. Each spot was measured in terms of the length (X) in the lateral direction and the length (Y) in the longitudinal direction (see FIG. 9) to calculate an average (=(X+Y)/2) as a diameter. Based on the diameter, an area of the spot was calculated. The results are shown in Table 6.

The same process was performed for the coating layer of the optical film of Comparative Example 1, and the surface portions were magnified with an optical microscope to count the number of spots where the particles were recognized to have separated due to the rubbing. 9 spots of separation were found. Similarly, each spot was measured in terms of the length (X) in the lateral direction and the length (Y) in the longitudinal direction to calculate an average (=(X+Y)/2) as a diameter. Based on the diameter, an area of the spot was calculated. The results are shown in Table 7.

TABLE 6

| | X | Y | (X + Y)/2 | Area [μm$^2$] |
|---|---|---|---|---|
| Ex. 2 | 26.3 | 20.6 | 23.5 | 1734 |
| | 8.9 | 12.3 | 10.6 | 352 |
| | 10.9 | 10.9 | 10.9 | 370 |
| | 14.6 | 10.9 | 12.7 | 509 |
| | 13.7 | 11.7 | 12.7 | 509 |
| | 11.4 | 12.3 | 11.8 | 440 |
| | 10.9 | 11.7 | 11.3 | 401 |
| | 10.0 | 13.7 | 11.8 | 440 |
| Total area | | | | 4757 |

TABLE 7

| | X | Y | (X + Y)/2 | Area [μm$^2$] |
|---|---|---|---|---|
| Comp. Ex. 1 | 48.6 | 26.9 | 37.7 | 4474 |
| | 26.3 | 28.3 | 27.3 | 2345 |
| | 14.1 | 13.2 | 13.6 | 583 |
| | 10.3 | 13.2 | 11.7 | 434 |
| | 12.3 | 13.2 | 12.7 | 509 |
| | 13.7 | 13.7 | 13.7 | 590 |
| | 28.7 | 27.8 | 28.2 | 2501 |
| | 13.2 | 13.7 | 13.4 | 567 |
| | 16.9 | 17.4 | 17.2 | 927 |
| Total area | | | | 12929 |

(Evaluation of Pencil Strength of Coating Layer)

A coating layer composition obtained by mixing the materials shown in Table 8 was applied onto the first film substrate of a 210-mm width to form a coating film of a 300-mm length with a wire bar coater. Then, the coating film was heated at 80° C. for 30 seconds for drying. The dried coating film was aged at 60° C. for 2 days. In this manner, the optical films for Example 6 and Comparative Example 2 were prepared. In Example 6 and Comparative Example 2, the coating layers formed on the respective first film substrates both had a thickness of 3 μm. It should be noted that, in Example 6, the same components as those of Examples 1 to 5 were used, and in Comparative Example 2, the same components as those of Comparative Example 1 were used.

Pencil strength was measured at twelve portions of the coating layer for each of Example 6 and Comparative Example 2 according to "Scratch hardness (pencil method)" of JIS K5600-5-4: 1999.

The load applied to the pencil tip was 500 g. The results are shown in Table 9.

TABLE 8

| Component | Example 6 | Comparative Example 2 |
|---|---|---|
| Main resin 1 | 10.00 kg | — |
| Main resin 2 | — | 13.00 kg |
| Transparent material | 15.70 kg | 15.56 kg |
| Curing agent | 1.24 kg | 1.38 kg |
| Antistatic agent | 0.91 kg | 1.01 kg |
| Solvent | 18.80 kg | 20.00 kg |
| Total | 46.65 kg | 50.95 kg |

TABLE 9

| | 1 | 2 | 3 | 4 | 5 | 6 | 7 | 8 | 9 | 10 | 11 | 12 |
|---|---|---|---|---|---|---|---|---|---|---|---|---|
| Ex. 6 | H | 2H | H | H | H | 2H | 2H | H | H | 2H | H | H |
| Comp. Ex. 2 | F | HB | B | B | F | H | H | H | HB | H | HB | HB |

INDUSTRIAL APPLICABILITY

The present disclosure provides an optical film having a haze value with sufficiently small in-plane variation, and also an optical barrier film, a color conversion film and a backlight unit using the optical film.

REFERENCE SIGNS LIST

10 . . . Optical film; 12 . . . First film substrate; 14 . . . Coating layer; 14A . . . Uneven surface; 16 . . . Binder resin; 18 . . . Fine particle; 20A, 20B, 20C, 20D, 20 . . . Optical barrier film; 22a, 22b . . . Composite barrier layer; 24, 24a, 24b . . . Barrier layer; 30 . . . Color conversion film; 32 . . . Color conversion layer; 40 . . . Backlight unit.

What is claimed is:

1. An optical film comprising:
a first film substrate; and
a coating layer formed on the first film substrate so that the coating layer is in direct physical contact with the first film substrate, wherein
the coating layer contains a binder resin and fine particles with an average size in the range of 0.5 μm or more and 10.0 μm or less and a standard deviation in size that is less than ½ of the average size, wherein a haze value of the optical film is from 31.8% to 70.5%, wherein the fine particles are selected from silicone resin fine particles, polypropylene resin fine particles and urethane resin fine particles, the first film substrate is selected from the group consisting of polyolefin film substrates, polyester film substrates, cellulose film substrates, polyamide film substrates, acrylic film substrates, polystyrene film substrates, polyvinyl chloride film substrates, polyimide film substrates, polyvinyl alcohol film substrates, polycarbonate film substrates, and ethylene vinyl alcohol film substrates, wherein the coating layer has an arithmetic mean roughness Ra of 0.3 μm or less, wherein the coating layer has a hardness in the range of H to 2H in terms of pencil hardness, wherein the binder resin is a heat-cured product of a thermosetting resin having a hydroxyl group and an isocyanate curing agent.

2. The optical film of claim 1, wherein the fine particles have a hardness of 100 or less on the Rockwell R hardness scale.

3. The optical film of claim 1, wherein the coating layer has a surface resistance of $1.0 \times 10^{13} \Omega/\square$ or less.

4. An optical barrier film comprising:
a barrier layer; and
the optical film of claim 1, wherein
the barrier layer is formed on a first film substrate-side surface of the optical film.

5. An optical barrier film comprising:
a composite barrier layer including a second film substrate and a barrier layer; and
the optical film of claim 1, wherein
the composite barrier layer is formed on a first film substrate-side surface of the optical film.

6. The optical barrier film of claim 4, wherein the barrier layer includes a vapor-deposited inorganic layer of silicon oxide expressed by $SiO_x$ ($1.0 \leq x \leq 2.0$), wherein the vapor-deposited inorganic layer has a thickness of 20 nm to 100 nm.

7. A color conversion film comprising:
a color conversion layer; and
two protective films disposed sandwiching the color conversion layer, wherein
at least one of the two protective films is the optical barrier film of claim 4; and
the optical barrier film is disposed so that the coating layer faces away from the color conversion layer.

8. A backlight unit comprising:
a light source;
a light guide plate; and
the color conversion film of claim 7 disposed on the light guide plate, wherein
the color conversion film is disposed so that the coating layer is in contact with the light guide plate.

9. The optical film of claim 1, wherein the thermosetting resin is a polyol resin and the isocyanate curing agent is a diisocyanate curing agent, and wherein the binder resin is the polyol resin cross-linked with the diisocyanate curing agent.

10. The optical film of claim 1, wherein the fine particles are silicone resin fine particles.

11. The optical film of claim 1, wherein the fine particles are polypropylene resin fine particles.

12. The optical film of claim 1, wherein the fine particles are urethane resin fine particles.

13. The optical film of claim 1, wherein the first film substrate is selected from the group consisting of polyolefin film substrates, polyester film substrates, cellulose film substrates, polyamide film substrates, polystyrene film substrates, polyvinyl chloride film substrates, polyimide film substrates, polyvinyl alcohol film substrates, and polycarbonate film substrates.

14. The optical film of claim 1, wherein the coating layer has a surface resistance from $1.58 \times 10^{11} \Omega/\square$ to $1.0 \times 10^{13} \Omega/\square$.

15. The optical film of claim 1, wherein the coating layer has a surface resistance from $1.58 \times 10^{11} \Omega/\square$ to $3.159 \times 10^{12} \Omega/\square$.

16. The optical film of claim 1, wherein the coating layer has a surface resistance from $2.63 \times 10^{11} \Omega/\square$ to $1.0 \times 10^{13} \Omega/\square$.

17. The optical film of claim 1, wherein the coating layer has a surface resistance from $2.63 \times 10^{11} \Omega/\square$ to $3.159 \times 10^{12} \Omega/\square$.

* * * * *